(12) United States Patent
Hashimoto et al.

(10) Patent No.: US 12,350,816 B2
(45) Date of Patent: *Jul. 8, 2025

(54) INTERMEDIATION DEVICE AND INTERMEDIATING METHOD USING THE SAME

(71) Applicant: KAWASAKI JUKOGYO KABUSHIKI KAISHA, Hyogo (JP)

(72) Inventors: Yasuhiko Hashimoto, Kobe (JP); Masayuki Kamon, Akashi (JP); Shigetsugu Tanaka, Akashi (JP); Yoshihiko Maruyama, Osaka (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/423,135

(22) Filed: Jan. 25, 2024

(65) Prior Publication Data

US 2024/0157571 A1   May 16, 2024

Related U.S. Application Data

(63) Continuation of application No. 17/267,464, filed as application No. PCT/JP2019/031697 on Aug. 9, 2019, now Pat. No. 11,992,933.

(30) Foreign Application Priority Data

Aug. 10, 2018  (JP) .................................. 2018-151917
Jun. 5, 2019   (JP) .................................. 2019-105749

(51) Int. Cl.
*B25J 13/02*       (2006.01)
*B25J 3/00*        (2006.01)
(Continued)

(52) U.S. Cl.
CPC .................. *B25J 13/02* (2013.01); *B25J 3/00* (2013.01); *B25J 9/1664* (2013.01); *B25J 9/1689* (2013.01);
(Continued)

(58) Field of Classification Search
CPC ........ B25J 13/02; B25J 9/1664; B25J 9/1689; B25J 13/006; B25J 13/06; B25J 3/00; G05B 2219/40174; A63F 13/23
See application file for complete search history.

(56) References Cited

U.S. PATENT DOCUMENTS 6,332,102 B1   12/2001  Nakajima et al.
2010/0241693 A1*  9/2010  Ando .................... G06Q 30/06
                                                  901/1

(Continued)

FOREIGN PATENT DOCUMENTS

CN      102113107 A    6/2011
JP      S6237309 U     3/1987
(Continued)

*Primary Examiner* — Sohana Tanju Khayer
(74) *Attorney, Agent, or Firm* — Studebaker Brackett PLLC

(57) ABSTRACT

An intermediation device (2) constitutes a manipulation signal converting module in the intermediation device (2) or a manipulation terminal (3). When the manipulation signal converting module receives a plurality of manipulation signals respectively corresponding to a plurality of manipulation keys, the manipulation signal converting module converts the plurality of manipulation signals into a plurality of individual operating commands, and sends the plurality of individual operating commands to a robot (5).

21 Claims, 12 Drawing Sheets

(51) Int. Cl.
  *B25J 9/16* (2006.01)
  *B25J 13/00* (2006.01)
  *B25J 13/06* (2006.01)
(52) U.S. Cl.
  CPC ............ *B25J 13/006* (2013.01); *B25J 13/06* (2013.01); *G05B 2219/40174* (2013.01)

(56) References Cited

U.S. PATENT DOCUMENTS

| | | |
|---|---|---|
| 2011/0130858 A1 | 6/2011 | Fujii |
| 2012/0238366 A1* | 9/2012 | Tedder ................ A63F 3/00643 463/42 |
| 2014/0031983 A1 | 1/2014 | Low et al. |
| 2016/0303739 A1 | 10/2016 | Apkarian et al. |
| 2017/0087715 A1* | 3/2017 | Komuro ............... A61B 90/361 |
| 2019/0202055 A1* | 7/2019 | Wang .................... B25J 9/1697 |
| 2019/0329423 A1* | 10/2019 | Shimodaira .............. B25J 13/06 |
| 2019/0351558 A1* | 11/2019 | Park .......................... G06T 7/70 |
| 2020/0019249 A1 | 1/2020 | Lee |
| 2020/0258232 A1* | 8/2020 | Miyamoto ................ G06T 7/11 |
| 2020/0290198 A1* | 9/2020 | Yanase .................... A63F 13/58 |

FOREIGN PATENT DOCUMENTS

| | | |
|---|---|---|
| JP | H11291185 A | 10/1999 |
| JP | 2007183332 A | 7/2007 |
| JP | 2009178820 A | 8/2009 |
| JP | 2012139746 A | 7/2012 |
| JP | 2014-014900 A | 1/2014 |
| JP | 2016002280 A | 1/2016 |
| JP | 2017061032 A | 3/2017 |
| KR | 20-0320700 Y1 | 7/2003 |
| WO | 2008140011 A1 | 11/2008 |

* cited by examiner

| OPERATION KEY OF GAME CONTROLLER | |
|---|---|
| KEY NAME | FUNCTION FOR GAME |
| CROSS KEY | MOVE MANIPULATION TARGET IN TWO AXIAL DIRECTIONS |
| LEFT JOYSTICK | MOVE MANIPULATION TARGET IN TWO-DIMENSIONAL DIRECTION |
| RIGHT JOYSTICK | MOVE VIEWPOINT OF GAME SPACE |
| 1ST MULTIPURPOSE KEY | APPROVE SETTING |
| 2ND MULTIPURPOSE KEY | CANCEL SETTING |
| 3RD MULTIPURPOSE KEY | ATTACK TARGET |
| 4TH MULTIPURPOSE KEY | ATTACK TARGET |
| LEFT COMMAND KEY | ACHIEVE PLURALITY OF GIVEN OPERATIONS BY SINGLE OPERATION |
| RIGHT COMMAND KEY | ACHIEVE PLURALITY OF GIVEN OPERATIONS BY SINGLE OPERATION |

FIG. 7

| MANIPULATION KEY OF ROBOT MANIPULATION DEVICE | | |
|---|---|---|
| KEY NAME | FUNCTION FOR ROBOT MANIPULATION | CORRESPONDING OPERATING COMMAND |
| 1ST AXIS KEY | MOVE 1ST AXIS OF ROBOT IN INDIVIDUAL AXIS MODE | 1ST AXIS OPERATING COMMAND |
| 2ND AXIS KEY | MOVE 2ND AXIS OF ROBOT IN INDIVIDUAL AXIS MODE | 2ND AXIS OPERATING COMMAND |
| 3RD AXIS KEY | MOVE 3RD AXIS OF ROBOT IN INDIVIDUAL AXIS MODE | 3RD AXIS OPERATING COMMAND |
| 4TH AXIS KEY | MOVE 4TH AXIS OF ROBOT IN INDIVIDUAL AXIS MODE | 4TH AXIS OPERATING COMMAND |
| 5TH AXIS KEY | MOVE 5TH AXIS OF ROBOT IN INDIVIDUAL AXIS MODE | 5TH AXIS OPERATING COMMAND |
| 6TH AXIS KEY | MOVE 6TH AXIS OF ROBOT IN INDIVIDUAL AXIS MODE | 6TH AXIS OPERATING COMMAND |
| ROBOT CONTROL MODE SWITCH KEY | SWITCH CONTROL MODE OF ROBOT BETWEEN INDIVIDUAL AXIS MODE, WORLD MODE, AND TOOL MODE | ROBOT CONTROL MODE SWITCH COMMAND |
| TOOL CONTROL MODE SWITCH KEY | SWITCH CONTROL MODE OF TOOL | TOOL CONTROL MODE SWITCH COMMAND |
| TOOL ON-OFF KEY | TURN ON/OFF TOOL | TOOL ON-OFF COMMAND |
| TOOL MANIPULATION KEY | MANIPULATE TOOL | TOOL OPERATING COMMAND |

FIG. 8

| ASSIGNMENT OF OPERATION KEY OF GAME CONTROLLER TO ROBOT OPERATING COMMAND IN INDIVIDUAL AXIS MODE | |
|---|---|
| KEY NAME | ROBOT OPERATING COMMAND |
| CROSS KEY | 1ST AXIS OPERATING COMMAND<br>2ND AXIS OPERATING COMMAND |
| LEFT JOYSTICK | 3RD AXIS OPERATING COMMAND<br>4TH AXIS OPERATING COMMAND |
| RIGHT JOYSTICK | 5TH AXIS OPERATING COMMAND<br>6TH AXIS OPERATING COMMAND |
| 1ST MULTIPURPOSE KEY | ROBOT CONTROL MODE SWITCH COMMAND |
| 2ND MULTIPURPOSE KEY | TOOL CONTROL MODE SWITCH COMMAND |
| 3RD MULTIPURPOSE KEY | TOOL ON-OFF COMMAND |
| 4TH MULTIPURPOSE KEY | TOOL OPERATING COMMAND |
| LEFT COMMAND KEY | NOT ASSIGNED |
| RIGHT COMMAND KEY | NOT ASSIGNED |

| ASSIGNMENT OF OPERATION KEY OF GAME CONTROLLER TO ROBOT OPERATING COMMAND IN CASE OF INDEPENDENT KEY OPERATION IN WORLD MODE | |
|---|---|
| KEY NAME | ROBOT OPERATING COMMAND |
| CROSS KEY | X-AXIS POSITION COMMAND<br>Y-AXIS POSITION COMMAND |
| LEFT JOYSTICK | X-AXIS ROTATION COMMAND<br>Y-AXIS ROTATION COMMAND |
| RIGHT JOYSTICK | Z-AXIS ROTATION COMMAND |
| 1ST MULTIPURPOSE KEY | ROBOT CONTROL MODE SWITCH COMMAND |
| 2ND MULTIPURPOSE KEY | TOOL CONTROL MODE SWITCH COMMAND |
| 3RD MULTIPURPOSE KEY | TOOL ON-OFF COMMAND |
| 4TH MULTIPURPOSE KEY | TOOL OPERATING COMMAND |
| LEFT COMMAND KEY | Z-AXIS POSITIVE POSITION COMMAND |
| RIGHT COMMAND KEY | Z-AXIS NEGATIVE POSITION COMMAND |

| ASSIGNMENT OF OPERATION KEY OF GAME CONTROLLER TO ROBOT OPERATING COMMAND IN CASE OF PLURAL KEY CONCURRENT OPERATION IN WORLD MODE | |
|---|---|
| KEY NAME | ROBOT OPERATING COMMAND |
| CROSS KEY | NOT ASSIGNED |
| LEFT JOYSTICK | NOT ASSIGNED |
| RIGHT JOYSTICK | NOT ASSIGNED |
| 1ST MULTIPURPOSE KEY AND 2ND MULTIPURPOSE KEY | 1ST COMMAND: AUTOMATICALLY MOVE TOOL IN X-AXIS DIRECTION BY FIRST OPERATION, AND STOP TOOL BY SECOND OPERATION |
| 3RD MULTIPURPOSE KEY AND 4TH MULTIPURPOSE KEY | 2ND COMMAND: AUTOMATICALLY MOVE TOOL IN Y-AXIS DIRECTION BY FIRST OPERATION, AND STOP TOOL BY SECOND OPERATION |
| LEFT COMMAND KEY AND RIGHT COMMAND KEY | 3RD COMMAND: AUTOMATICALLY MOVE TOOL IN Z-AXIS DIRECTION BY FIRST OPERATION, AND STOP TOOL BY SECOND OPERATION |

FIG. 11

| ASSIGNMENT OF OPERATION KEY OF GAME CONTROLLER TO ROBOT OPERATING COMMAND IN TOOL MODE | |
|---|---|
| KEY NAME | ROBOT OPERATING COMMAND |
| CROSS KEY | O-AXIS POSITION COMMAND<br>A-AXIS POSITION COMMAND |
| LEFT JOYSTICK | T-AXIS POSITION COMMAND |
| RIGHT JOYSTICK | NOT ASSIGNED |
| 1ST MULTIPURPOSE KEY | ROBOT CONTROL MODE SWITCH COMMAND |
| 2ND MULTIPURPOSE KEY | TOOL CONTROL MODE SWITCH COMMAND |
| 3RD MULTIPURPOSE KEY | TOOL ON-OFF COMMAND |
| 4TH MULTIPURPOSE KEY | TOOL OPERATING COMMAND |
| LEFT COMMAND KEY | NOT ASSIGNED |
| RIGHT COMMAND KEY | NOT ASSIGNED |

FIG. 12

INTERMEDIATION DEVICE AND INTERMEDIATING METHOD USING THE SAME

CROSS-REFERENCE TO RELATED APPLICATIONS

This application is a Continuation of U.S. patent application Ser. No. 17/267,464 filed Feb. 9, 2021, which is the U.S. National Stage of International Application No. PCT/JP2019/031697 filed Aug. 9, 2019, which claims benefit of priority to Japanese Patent Application No. 2018-151917 filed Aug. 10, 2018, and Japanese Patent Application No. 2019-105749 filed Jun. 5, 2019, the entire contents of which are incorporated herein by reference.

TECHNICAL FIELD

The present disclosure relates to an intermediation device and an intermediating method using the same.

BACKGROUND ART

Conventionally, robots which are controlled remotely are known. For example, in a remote manipulator system disclosed in Patent Document 1, a robot manipulator is operated by an operator at a remote-control station.

REFERENCE DOCUMENT OF CONVENTIONAL ART

Patent Document

[Patent Document 1] JP2017-061032A

DESCRIPTION OF THE DISCLOSURE

Problem to be Solved by the Disclosure

Meanwhile, robots including the remote control robots described above have not been used widely in society. Therefore, it is necessary to expand the utilization of the remote control robots.

The present disclosure is made in view of solving such a problem, and one purpose thereof is to provide an intermediation device and an intermediating method using the same, which can expand utilization of a remote control robot.

SUMMARY OF THE DISCLOSURE

The present inventors diligently examined the problem described above. As a result, they acquired the following knowledge.

In order to expand the utilization of the remote control robots, it is necessary not only to expand the field of application of the robots, but also to increase the opportunity that more people in society other than those involved in the manufacturing industry touch the robots.

In society, there are people who are not employed (hereinafter, referred to as "the specific unemployed") because of unavoidable situations, such as raising children, nursing, illness, handicap, and weakening of physical strength. Among them, for example, like there are some gamers (game players) who have exceptionally-excellent skills in the game about operating a game controller, it is assumed that there are also some people who have exceptionally-excellent skills about the robot manipulation.

Therefore, the present inventors reached such thought that opportunities are to be created for them to touch the robots to let them contribute the society. In detail, for example, they manipulate industrial robots through the Internet by using a game controller while being at home, and get paid for the work. In general, a manipulation device of the industrial robot is not available for normal person because it is a highly-sophisticated and expensive communicator. On the other hand, a game controller is available for the normal person at about several tens of thousands JPY because it is a relatively low-tech manipulation device using key operation. Further, if the manipulation signal by the key operation at the game controller can be converted into an operating command for the industrial robot, the operator of the game controller can well operate the robot through the signal conversion.

According to a system of such a way of work (hereinafter, referred to as a "robot work working system"), the specific unemployed can be made contribute to the actual world. Note that the specific unemployed can get income while being at home. Meanwhile, it is said that the population of gamers is about 30 million people while the population in the manufacturing industries is about 10 million people. Therefore, according to the robot work working system, the robot manufacturer can build a social infrastructure for remote-controlled robots as they intend.

Moreover, when the specific unemployed is a gamer, he/she can remarkably improve the productivity of the work with the robot by utilizing the enthusiasm and skills. In other words, those people who are enthusiastic to games are made to participate in the robot's world and they are motivated so as to be enthusiastic, thereby remarkably improving their skills for operating the robots.

The present disclosure is made based on such a knowledge.

In order to achieve the above purpose, an intermediation device according to one aspect of the present disclosure is connected to a manipulation terminal and a robot through a network in which data communication is possible. The intermediation device constitutes a manipulation signal converting module in the intermediation device or the manipulation terminal. The robot operates according to an operating command including an individual operating command. The manipulation terminal is provided with a manipulation key. When the manipulation signal converting module receives a manipulation signal corresponding to the manipulation key, the manipulation signal converting module converts the manipulation signal into the individual operating command and sends the individual operating command to the robot. Here, the "robot" is at least either an industrial robot or a service robot, but it is not a robot for amusement. This is because one of the purposes of the present disclosure is to make the specific unemployed contribute the society. Note that the medical-application robot may be excluded from the "robot." This is because, in order to operate the medical-application robot, qualification(s), technical knowledge, etc. of medical practice may be required.

According to this configuration, when the manipulation signal converting module receives the manipulation signal corresponding to the manipulation key of the manipulation terminal, the manipulation signal converting module converts the manipulation signal into the individual operating command in the operating command of the robot and sends the individual operating command to the robot. Thus, the robot can be manipulated through the network and the intermediation device by operating the manipulation key of the manipulation terminal. Therefore, the robot work working system can be caused to function, and, as a result, the utilization of the remote control robot can be expanded.

The operating command may include one or more individual operating commands. The manipulation terminal may be provided with a plurality of manipulation keys. When the manipulation signal converting module receives one or more manipulation signals corresponding to the plurality of manipulation keys, the manipulation signal converting module may convert the one or more manipulation signals into one or more individual operating commands, and send the one or more individual operating commands to the robot.

According to this configuration, the one or more manipulation signals corresponding to the plurality of manipulation keys can be converted into one or more individual operating commands.

The plurality of manipulation keys may include a move key configured to move a manipulation target and a function key used for multiple purposes. The operating command may include, as the individual operating command, a position command for instructing the position of a wrist part of the robot, and an end effector operating command for controlling operation of an end effector attached to the wrist part of the robot. The manipulation signal converting module may convert the manipulation signal corresponding to the move key into the position command and convert the manipulation signal corresponding to the function key into the end effector operating command.

According to this configuration, since the position command indicating the position of the wrist part of the robot corresponds to the manipulation signal of the move key which moves the manipulation target in a desired direction similarly to the move key, the operator of the manipulation terminal can manipulate the robot without feeling uncomfortable so much.

When the intermediation device receives a manipulation key change notice from the manipulation terminal, the manipulation signal converting module may change the one or more individual operating commands to be converted from the one or more manipulation signals, according to the manipulation key change notice.

According to this configuration, the one or more individual operating command to be converted from the one or more manipulation signals can be changed so that the operator of the manipulation terminal can operate the manipulation key easily.

When the number of the plurality of manipulation keys of the manipulation terminal is short for the number of the one or more individual operating commands, the manipulation signal converting module may convert each of the manipulation signals corresponding to operation in a given mode of one or more manipulation keys among the plurality of manipulation keys into the one or more individual operating commands.

According to this configuration, the conversion of the manipulation signal to the individual operating command can be performed even if the number of manipulation keys of the manipulation terminal is short for the number of individual operating commands.

The manipulation signal converting module may convert at least one of the one or more manipulation signals into one or more individual operating commands for causing the robot to perform a plurality of operations.

According to this configuration, a command for causing the robot to perform a plurality of operations by one or more individual operating commands can be generated. Examples of such a command include a "pick and place" command for causing the robot to lift a workpiece and place it at a given location, and a command for causing the robot to move a painting gun to a given location and discharge paint from the painting gun.

The manipulation signal converting module may convert at least one of the one or more manipulation signals into one individual operating command for causing the robot to perform a plurality of operations.

According to this configuration, the command for causing the robot to perform a plurality of operations by one individual operating command can be generated. An example of such a command is a command for causing the robot to position a workpiece with a fitting protrusion above a workpiece with a fitting hole, then lower the workpiece with the fitting protrusion, and fit the fitting protrusion into the fitting hole.

The manipulation signal converting module may convert at least one of the one or more manipulation signals into the individual operating command for switching a control mode of the robot.

According to this configuration, the control mode of the robot can be switched by operating the manipulation key of the manipulation terminal.

The intermediation device may request the manipulation terminal to determine a manipulation key assignment indicating how to associate the plurality of manipulation keys with the one or more individual operating commands and convert the one or more manipulation signals corresponding to the plurality of manipulation keys into the one or more individual operating commands. The manipulation signal converting module may convert the one or more manipulation signals into the one or more individual operating commands, according to the manipulation key assignment determined by the manipulation terminal.

According to this configuration, the operator of the manipulation terminal can determine in advance the manipulation key assignment before the conversion of the manipulation signal into the operating command so that the operator can operate the manipulation key easily.

The intermediation device may perform the conversion from the manipulation signal to the operating command based on model names received from the manipulation terminal and the selected robot.

According to this configuration, based on the model names of the selected manipulation terminal and the selected robot, the conversion from the manipulation signal into the operating command can be performed in a mode suitable for both the selected manipulation terminal and the selected robot.

The intermediation device may store patterns of the signal conversion according to the model names of the manipulation terminal and the robot, and perform the signal conversion while applying the pattern corresponding to the model names of the selected manipulation terminal and the selected robot.

According to this configuration, the conversion from the manipulation signal into the operating command can be performed by a simplified configuration in a mode suitable for both the selected manipulation terminal and the selected robot.

Moreover, an intermediating method according to another aspect of the present disclosure uses an intermediation device connected to a manipulation terminal and a robot through a network in which data communication is possible. The robot operates according to an operating command including an individual operating command, and the manipulation terminal is provided with a manipulation key. The method includes the steps of constituting a manipulation signal converting module in the intermediation device or the manipulation terminal, and when the manipulation signal converting module receives a manipulation signal corresponding to the manipulation key, converting the manipulation signal into the individual operating command and sending the individual operating command to the robot, by the manipulation signal converting module.

According to this configuration, the robot work working system can be caused to function, and, as a result, the utilization of the remote control robot can be expanded.

Effect of the Disclosure

The present disclosure can provide an intermediation device which can expand the utilization of a remote control robot and an intermediating method using the intermediation device.

BRIEF DESCRIPTION OF DRAWINGS

FIG. 7 is a table illustrating types of the key of the game controller.

FIG. 8 is a table illustrating types of the key of a robot manipulation device.

FIG. 9 is a table illustrating an assignment of an operation key of the game controller to an operating command of the robot in an individual axis mode.

FIG. 10 is a table illustrating an assignment of the operation key of the game controller to the operating command of the robot in case of an independent key operation in a world mode.

FIG. 11 is a table illustrating an assignment of the operation key of the game controller to the operating command of the robot in case of a plural key concurrent operation in the world mode.

FIG. 12 is a table illustrating an assignment of the operation key of the game controller to the operating command of the robot in a tool mode.

MODES FOR CARRYING OUT THE DISCLOSURE

Figure 1:
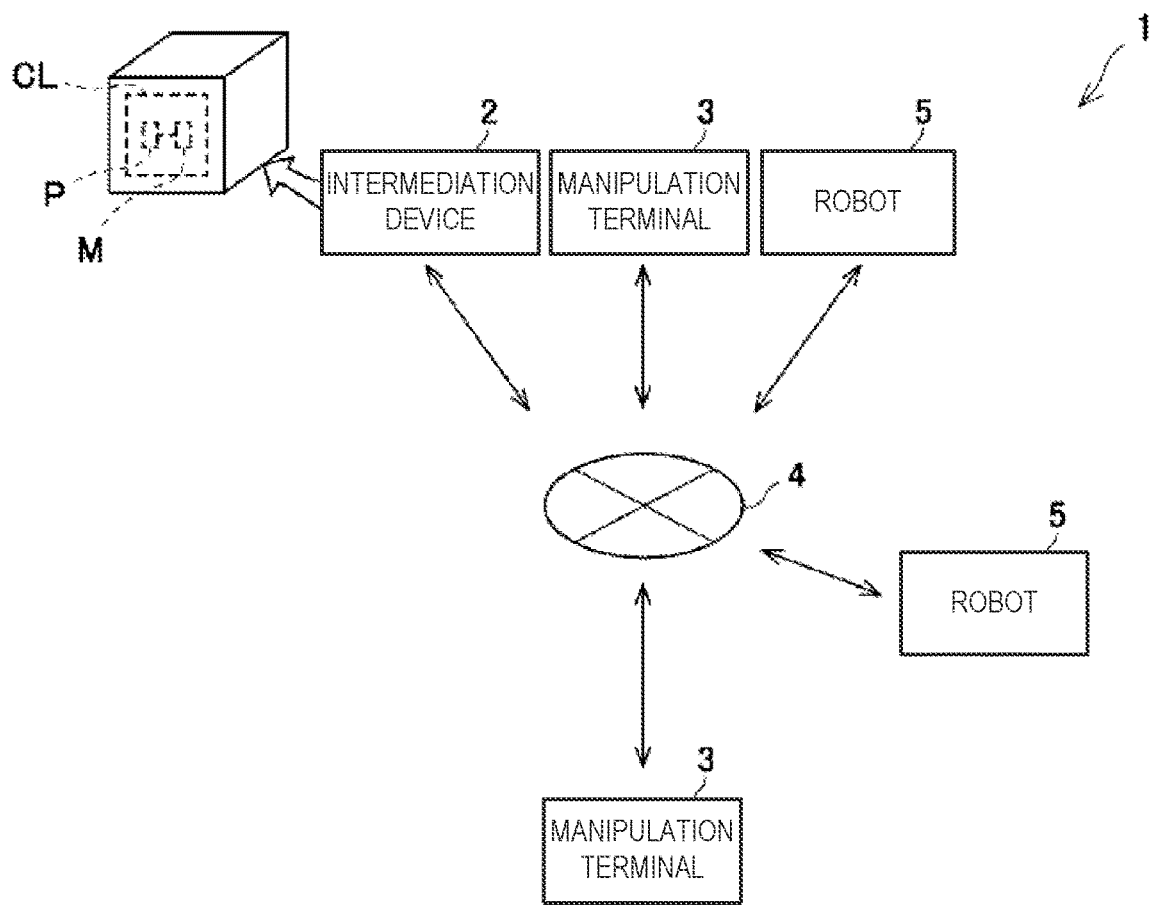
FIG. 1 is a schematic view schematically illustrating one example of a configuration of a robot work working system in which an intermediation device according to Embodiment 1 of the present disclosure is used.

Hereinafter, embodiments of the present disclosure will be described with reference to the drawings. Note that, below, the same reference characters are assigned to the same or corresponding elements throughout the drawings to omit redundant description. Moreover, the present disclosure is not limited to the following embodiments.

Embodiment 1

[Outline of Robot Work Working System]

FIG. 1 is a schematic view schematically illustrating one example of a configuration of a robot work working system 1 in which an intermediation device according to Embodiment 1 of the present disclosure is used.

Referring to FIG. 1, the robot work working system 1 includes an intermediation device 2, a plurality of manipulation terminals 3, and a plurality of robots 5, which are connected with each other through a network 4 where data communication is possible.

Below, an outline of the robot work working system 1 is described.

<Robot Work Working System 1>

The robot work working system 1 is a system for a way of working which makes the specific unemployed contribute to the actual world and enables the specific unemployed to obtain the income while being at home, and is also a robot remote control system which makes it possible to build a social infrastructure for the remote-controlled robots.

<Intermediation Device 2>

An intermediary retains the intermediation device 2. The intermediary is a coordinator who coordinates a job offer to a worker (hereinafter, referred to as a "remote worker") who performs a work by remote-controlling the robot 5 retained by a robot holder, with a job seeking for a work using the robot 5 by an operator of the manipulation terminal 3.

In detail, the intermediary performs the coordination by establishing a robot work working site on the network 4 by using the intermediation device 2.

The intermediary includes a robot manufacturer, an administrator of an online shop, a personnel dispatching company. The intermediation device 2 is comprised of a server. The phrase "retaining the intermediation device 2" as used herein includes both a form of owning the intermediation device 2 and a form of borrowing the intermediation device 2.

Note that, below, description of a configuration related to an adjustment of the intermediation device 2 between the job offer for the remote workers and the job seeking for the work of the robot 5 is omitted, and only a configuration for a conversion of a manipulation signal from the manipulation terminal 3 by the intermediation device 2 into an operating command for the robot 5 is described.

<Manipulation Terminal 3>

The manipulation terminal 3 is comprised of an information terminal which is connectable to the network 4. In detail, the manipulation terminal 3 includes a game machine, a game controller, a personal data assistant (PDA), a smartphone, a personal computer, and a tablet. If the manipulation terminal 3 is an existing manipulation terminal other than the remote controller dedicated for robots, the manipulation terminal 3 can effectively be used as an infrastructure for disseminating robots. On the other hand, if the manipulation terminal 3 is the remote controller dedicated for robots, since the conversion of the manipulation signal is not necessary, the manipulation terminal 3 with high operating efficiency can be provided.

"The form in which the remote worker operates the manipulation terminal 3" includes a form in which the remote worker owns the manipulation terminal 3, a form in which the remote worker borrows the manipulation terminal 3, and a form in which the remote worker operates the manipulation terminal 3 of another person (e.g., a form in which the remote worker operates a game machine at a video arcade).

The "remote worker" is not limited in particular. The remote worker may be a regular person, in addition to the specific unemployed. The remote worker may have a specific qualification (e.g., a care worker, a nurse, etc.) if getting a specific robot work.

<Network 4>

The network 4 may be any network, as long as data communication is possible therethrough. The network 4 includes the Internet, LAN (Local Area Network), and WAN (Wide Area Network).

<Robot 5>

The "robot" (robot 5) in the present disclosure is at least either an industrial robot or a service robot, but it is not a robot for amusement. This is because one of the purposes of the present disclosure is to make the specific unemployed contribute the society.

The industrial robot includes a vertical articulated robot, a horizontal articulated robot, a parallel-link robot, a rectangular-coordinate robot, and a polar-coordinate robot.

The service robot includes a rescue robot, a cleaning robot, a wall surface working robot, a guard robot, a guidance robot, a wheelchair robot, a sushi robot, a nursing care robot, a drone robot, and a medical-application robot. Note that the medical-application robot may be excluded from the "robot" (robot 5) in the present disclosure. This is because, in order to operate the medical-application robot, qualification(s), technical knowledge, etc. of medical practice may be required.

The robot for amusement includes a robot for games, a toy robot, and a pet robot. The robot for games includes a robot for competition games, a racing car robot for car race games, and a UFO catcher.

Here, the robot 5 is remotely controlled by the manipulation terminal 3 through the intermediation device 2.

[Configuration of Each Element of Robot Work Working System 1]

Below, a configuration of each element which constitutes the robot work working system 1 is described in detail.

<Manipulation Terminal 3>

Figure 2:
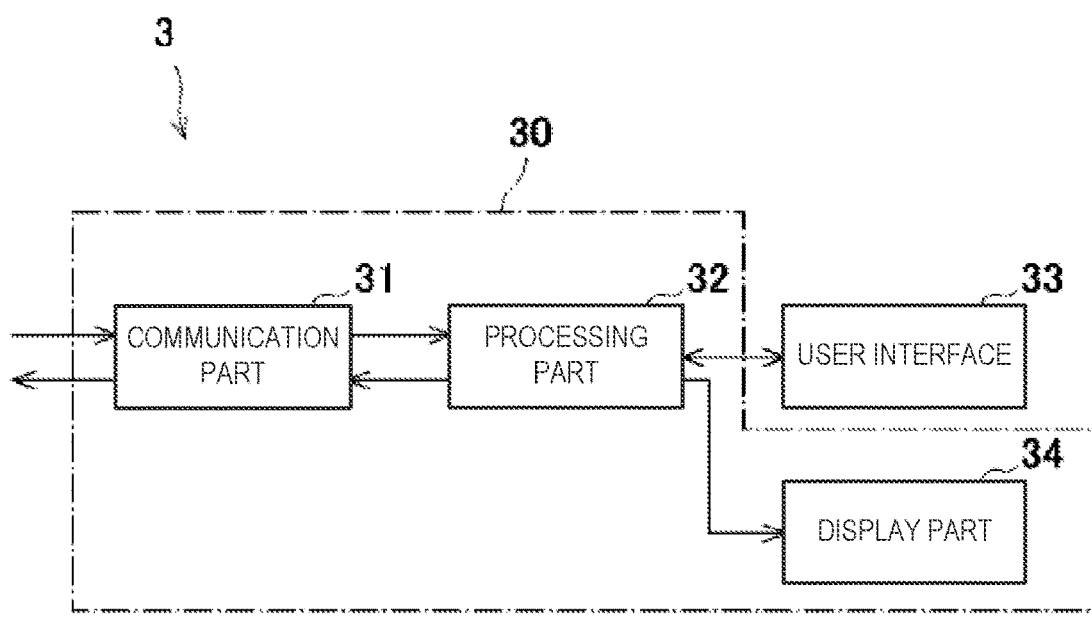
FIG. 2 is a functional block diagram illustrating one example of a configuration of a manipulation terminal of FIG. 1.

FIG. 2 is a functional block diagram illustrating a configuration example of the manipulation terminal 3 of FIG. 1. Referring to FIG. 2, the manipulation terminal 3 includes a main body 30 and a user interface 33. The main body 30 includes a communication part 31, a processing part 32, and a display part 34. The communication part 31 carries out data communications with the intermediation device 2 through the network 4. In detail, the communication part 31 converts information from the processing part 32 into communication data, and transmits the converted communication data to the intermediation device 2. Moreover, the communication part 31 converts the communication data from the intermediation device 2 into the original information, and sends the converted information to the processing part 32. Here, the processing part 32 sends a manipulation signal generated by operating a manipulation key of the user interface 33, to the intermediation device 2 through the communication part 31. Moreover, the processing part 32 displays on the display part 34 a work image of the robot 5 which is received from the intermediation device 2 through the communication part 31. Moreover, the processing part 32 performs various kinds of communications with the intermediation device 2 according to a suitable operation of the manipulation key of the user interface 33.

When a plurality of manipulation keys are operated, the user interface 33 generates a manipulation signal according to the operation.

Below, a case where the manipulation terminal 3 is the game machine is described.

Figure 3:
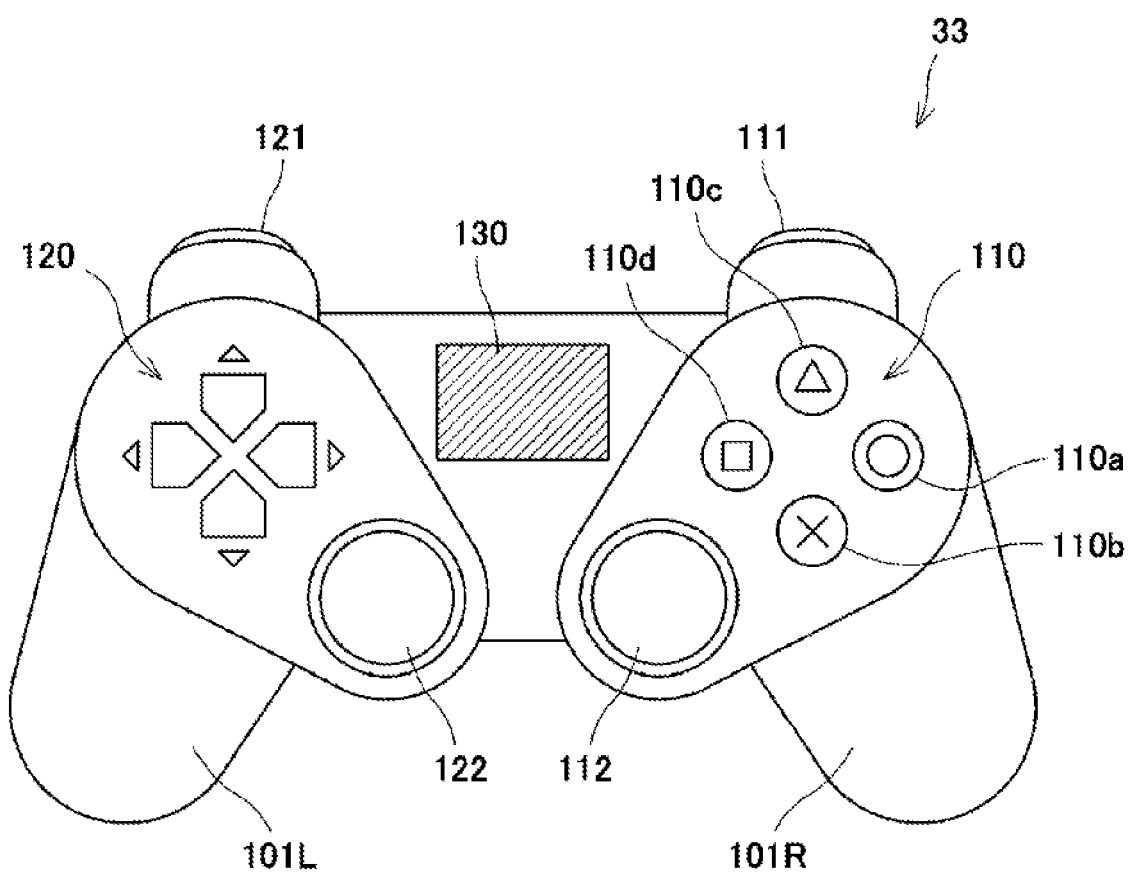
FIG. 3 is an outline view illustrating one example of a configuration of a game controller of a game machine, as a manipulation terminal.

FIG. 3 is an outline view illustrating one example of a configuration of a game controller 33 of the game machine as the manipulation terminal 3.

Referring to FIG. 3, the game controller 33 has a substantially inverted U-shape. The operator (here, the remote worker) holds handles 101L and 101R at both wing parts with both left and right hands and operates the game controller 33. An operation key group 110, a cross key 120, a right joystick 112, and a left joystick 122 are provided in left and right upper surfaces of the game controller 33. A right command key 111 is provided in a right front surface of the game controller 33, and a left command key 121 is provided in a left front surface. The operation key group 110 is comprised of a first multipurpose key 110a, a second multipurpose key 110b, a third multipurpose key 110c, and a fourth multipurpose key 110d.

The operation key group 110 and the right joystick 112 are operated with the operator's right-hand thumb, and the cross key 120 and the left joystick 122 are operated with the operator's left-hand thumb. Moreover, the right command key 111 and the left command key 121 are operated with the operator's right-hand index finger and left-hand index finger, respectively. The game controller 33 is further provided with a touchpad 130 between the operation key group 110 and the cross key 120.

<Robot 5>

Figure 4:
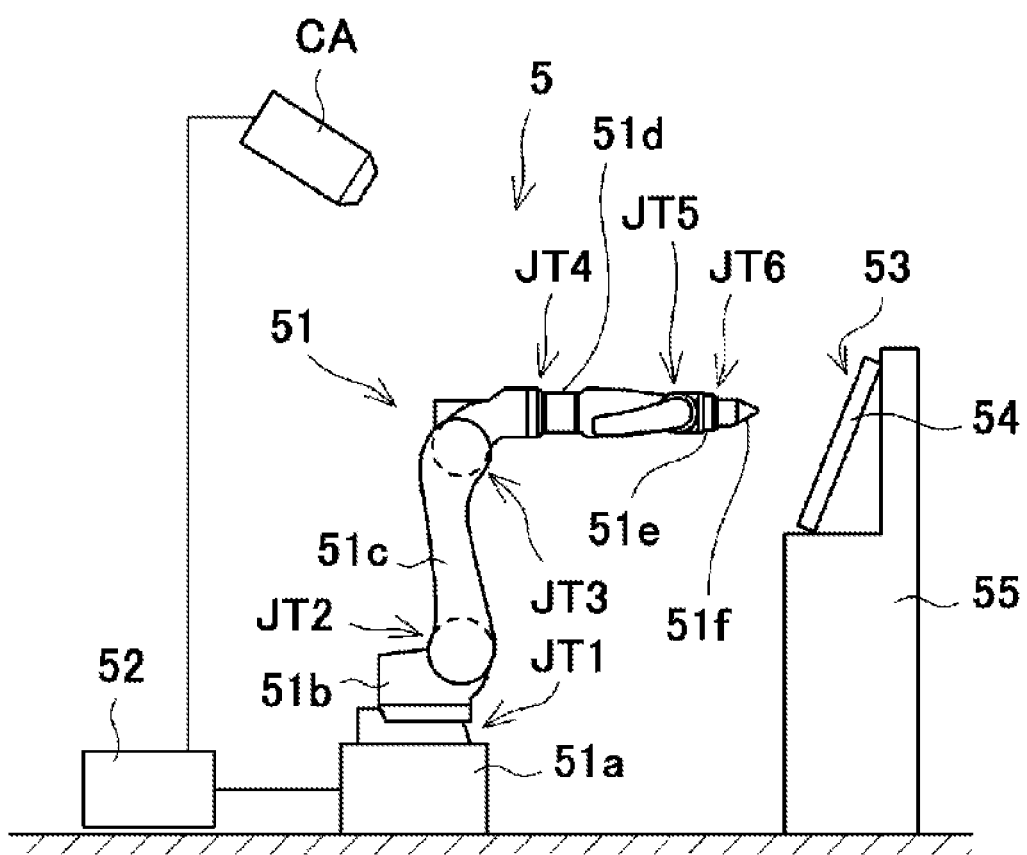
FIG. 4 is a schematic view schematically illustrating one example of a configuration of the robot of FIG. 1.

FIG. 4 is a schematic view schematically illustrating one example of a configuration of the robot 5 of FIG. 1. Referring to FIG. 4, the robot 5 includes a robot body 51, a robot controller 52, and a camera CA as an imaging device.

The robot body 51 is, for example, a vertical articulated robot, and includes a pedestal 51a, a rotary body 51b, a lower arm 51c, an upper arm 51d, a wrist 51e, and an end effector 51f which is attached to a tip end of the wrist 51e. Here, the end effector 51f is a painting gun.

Here, the work of the robot 5 is painting of a work object 53. The work object 53 is a panel 54 placed on a support table 55. The robot 5 is operated by the remote worker to discharge paint and paint the panel 54 while moving the painting gun 51f. The camera CA images a situation of the work by the robot 5, and sends the captured work image to the robot controller 52.

Figure 5:
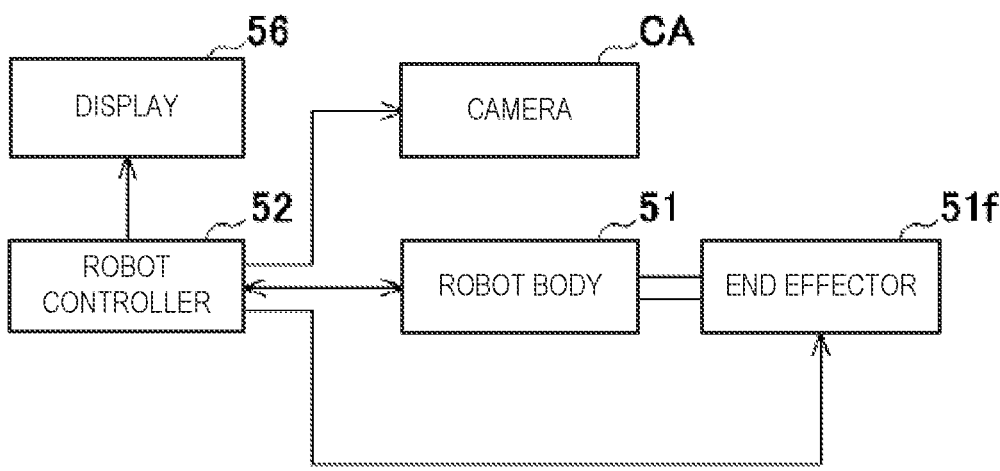
FIG. 5 is a functional block diagram illustrating one example of a configuration of a control system of the robot.

FIG. 5 is a functional block diagram illustrating one example of a configuration of a control system of the robot 5. Referring to FIG. 5, the robot controller 52 controls operation of the robot body 51 and the end effector 51f according to the operating commands (individual operating commands) sent from the intermediation device 2. Moreover, it sends the work image from the camera CA to the intermediation device 2. Moreover, the robot controller 52 carries out data communication with the intermediation device 2 through the network 4, and displays the content of the communication on a display 56 as needed. In the data communication with the intermediation device 2, a given operator operates an input device (not illustrated), if needed, to perform necessary processing (e.g., recruiting processing etc.).

In the present disclosure, the robot controller 52 carrying out the data communication is expressed as "the robot 5 carrying out the data communication."

<Intermediation Device 2>

Figure 6:
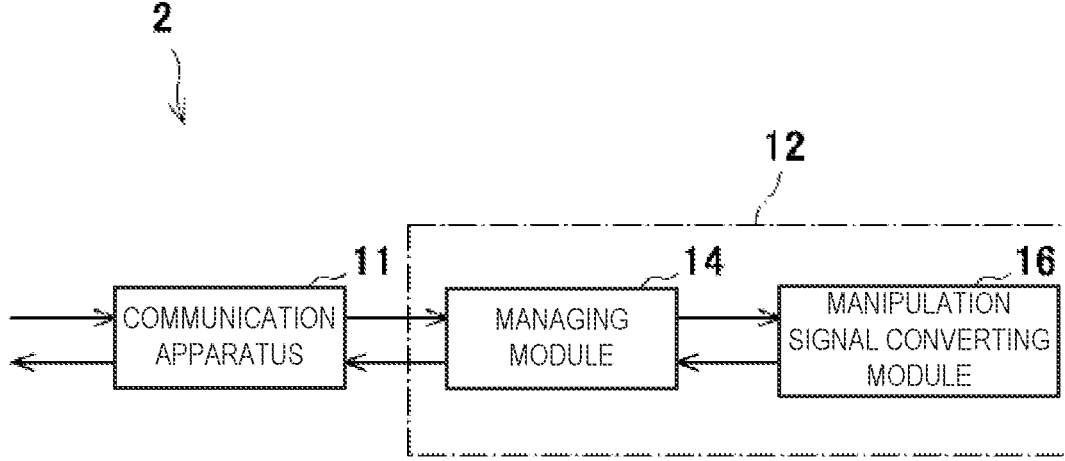
FIG. 6 is a functional block diagram illustrating one example of a configuration of the intermediation device of FIG. 1.

FIG. 6 is a functional block diagram illustrating one example of a configuration of the intermediation device of FIG. 1. In FIG. 6, arrows represent a flow of information (data, a signal, a command, a notification, etc.).

Referring to FIG. 6, the intermediation device 2 is comprised of a server. In detail, the intermediation device 2 includes a communication apparatus 11 and an information processing device 12.

The communication apparatus 11 may be any apparatus, as long as the data communication is possible.

The information processing device 12 includes a managing module 14 and a manipulation signal converting module 16.

Referring to FIGS. 1 and 6, the information processing device 12 is comprised of a computing unit CL having a processor P and a memory M, for example. The managing module 14 and the manipulation signal converting module 16 are functional blocks which are implemented by the processor P executing a given program stored in the memory M of the computing unit CL. In detail the computing unit CL is comprised of, for example, a computer, a personal computer, a microcontroller, an MPU, an FPGA (Field Programmable Gate Array), a PLC (Programmable Logic Controller), etc. The information processing device 12 may be comprised of a sole computing unit CL which performs a centralized control, or may be comprised of a plurality of the computing units CL which performs a distributed control.

"The intermediation device constitutes the manipulation signal converting module in the intermediation device" in the claims means that the manipulation signal converting module 16 is implemented by the processor P executing the given program stored in the memory M of the computing unit CL, as described above. Moreover, "the intermediation device constitutes the manipulation signal converting module in the manipulation terminal" in the claims means that a manipulation signal converting module 35 (see FIG. 15) is implemented by the intermediation device 2 downloading, among the given programs, a program for implementing the manipulation signal converting module to the manipulation terminal 3 and the downloaded program runs in the manipulation terminal 3.

In the intermediation device 2, the communication apparatus 11 performs the data communication with the manipulation terminal 3 and the robot 5 through the network 4. In detail, the communication apparatus 11 converts information from the managing module 14 into communication data, and transmits the converted communication data to the manipulation terminal 3 or the robot 5. Moreover, the communication apparatus 11 converts the communication data from the manipulation terminal 3 or the robot 5 into the original information, and sends the converted information to the managing module 14.

The managing module 14 establishes a robot work working site on the network 4, and accepts accesses to this site from the manipulation terminal 3 and the robot 5. The managing module 14 performs various kinds of communications with the manipulation terminal 3 and the robot 5.

Particularly, the managing module 14 carries out a "manipulation key assignment" (described later), and performs a distribution of the manipulation signal from the communication apparatus 11 to the manipulation signal converting module 16 and a transmission of the operating command from the manipulation signal converting module 16 to the communication apparatus 11.

When the manipulation signal converting module 16 receives the manipulation signal from the manipulation terminal 3 through the communication apparatus 11 and the managing module 14, it converts the manipulation signal into the operating command, and sends it to the robot 5 through the managing module 14 and the communication apparatus 11. Note that the manipulation signal converting module 16 does not perform the conversion, when the manipulation signal is not necessary to be converted (e.g., the manipulation signal in case of the user interface of the manipulation terminal 3 being the manipulation device dedicated for the robot 5). Moreover, the work image from the robot 5 passes through the manipulation signal converting module 16, and goes toward the manipulation terminal 3.

{Conversion of Manipulate Signal}

Next, the conversion from the manipulation signal of the manipulation terminal 3 into the operating command for the robot 5 is described. The conversion from the manipulation signal to the operating command can always be performed by the following procedures.

First, the manipulation signal of the manipulation terminal 3 is assigned to the operating command for the robot 5. In other words, the manipulation key of the manipulation terminal 3 is assigned to the operating command for the robot 5. Second, based on the assigned manipulation signal, the operating command corresponding to the manipulation signal is generated. Third, if the number of manipulation signals is short for the number of operating commands, a combination of a plurality of given manipulation signals is assigned to the remaining operating command. In other words, a combination of a plurality of given manipulation keys which are simultaneously pushed is assigned to the remaining operating command.

The manipulation signal converting module 16 patternizes a conversion scheme from the manipulation signal to the operating command for the manipulation signals (manipulation keys) of a large number of manipulation terminals 3 of well-known model names and the operating commands of a large number of robots 5 of well-known model names, and stores the pattern. Meanwhile, a model name of the manipulation terminal 3 is separately notified from the manipulation terminal, and a model name of the robot 5 is separately notified from the robot 5. Therefore, the manipulation signal converting module 16 can convert the manipulation signal into the operating command by using the conversion scheme from the manipulation signal to the operating command, which is applicable to the model name of the manipulation terminal 3 and the model name of the robot 5.

{Manipulation Key Assignment}

Next, a manipulation key assignment is described. The manipulation key assignment indicates how a plurality of manipulation keys of the manipulation terminal 3 is associated with one or more individual operating commands of the robot 5, and how one or more manipulation signals corresponding to the plurality of manipulation keys are converted into the one or more individual operating commands Below, a case where the manipulation terminal 3 is a game machine provided with the game controller 33 of FIG. 3 is described.

*Operation Key of Game Controller 33*

FIG. 7 is a table illustrating types of the key of the game controller 33. Referring to FIGS. 3 and 7, the plurality of operation keys of the game controller 33 have the following functions in major games.

The cross key 120 moves the manipulation target in two axial directions. The left joystick 122 moves the manipulation target in a two-dimensional direction. The right joystick 112 moves a viewpoint of a game space. The first multipurpose key 110a approves setting. The second multipurpose key 110b cancels the setting. The third multipurpose key 110c attacks the target. The fourth multipurpose key 110d attacks the target. The left command key 121 achieves a plurality of given operations by a single operation. The right command key 111 achieves a plurality of given operations by a single operation.

*Manipulation Key of Robot Manipulation Device*

First, joints of the robot 5 are described. Referring to FIG. 4, the robot body 51 has a first axis JT1 which is a joint for swiveling the rotary body 51b with respect to the pedestal 51a, a second axis JT2 which is a joint for rotating the lower arm 51c with respect to the rotary body 51b, a third axis JT3 which is a joint for bending the upper arm 51d with respect to the lower arm 51c, a fourth axis JT4 which is a joint for twisting the upper arm 51d, a fifth axis JT5 which is a joint for bending the wrist 51e with respect to the upper arm 51d, and a sixth axis JT6 which is a joint for rotating (twisting) the end effector 51f with respect to the wrist 51e.

Next, the manipulation key of the robot manipulation device is described. This robot manipulation device is assumed to be a manipulation device which generates the manipulation signal used as the foundation of the operating command for the robot 5. The robot 5 may or may not be provided with this robot manipulation device. If the robot 5 has the robot manipulation device, the robot controller 52 switches between the manipulation signal from the robot manipulation device and the operating command from the intermediation device 2, and uses it for the motion control for the robot 5.

FIG. 8 is a table illustrating types of the key of the robot manipulation device. Referring to FIGS. 4 and 8, the robot manipulation device includes first to sixth axis keys, a robot control mode switch key, a tool control mode switch key, a tool on-off key, and a tool manipulation key.

These manipulation keys have the following functions.

The first axis key moves the first axis JT1 of the robot in an individual axis mode. A first axis operating command is generated based on the manipulation signal of the first axis key.

The second axis key moves the second axis JT2 of the robot in the individual axis mode. A second axis operating command is generated based on the manipulation signal of the second axis key.

The third axis key moves the third axis JT3 of the robot in the individual axis mode. A third axis operating command is generated based on the manipulation signal of the third axis key.

The fourth axis key moves the fourth axis JT4 of the robot in the individual axis mode. A fourth axis operating command is generated based on the manipulation signal of the fourth axis key.

The fifth axis key moves the fifth axis JT5 of the robot in the individual axis mode. A fifth axis operating command is generated based on the manipulation signal of the fifth axis key.

The sixth axis key moves the sixth axis JT6 of the robot in the individual axis mode. A sixth axis operating command is generated based on the manipulation signal of the sixth axis key.

The robot control mode switch key switches the control mode of the robot between the individual axis mode, a world mode, and a tool mode. A robot control mode switch command is generated based on the manipulation signal of the robot control mode switch key.

The tool control mode switch key switches the control mode of a tool (here, the end effector 510. A tool control mode switch command is generated based on the manipulation signal of the tool control mode switch key.

The tool on-off key turns on/off the tool. A tool on-off command is generated based on the manipulation signal of the tool on-off key. The tool manipulation key operates the tool. A tool operating command is generated based on the manipulation signal of the tool manipulation key.

*Manipulation Key Assignment*

Next, a manipulation key assignment is described.

FIG. 9 is a table illustrating an assignment of the operation key of the game controller to the operating command for the robot 5 in the individual axis mode. In the individual axis mode, the entire body 51 of the robot 5 can be operated finely by operating each of the axes JT1-JT6 of the body 51 of the robot 5.

Referring to FIGS. 3 and 9, the cross key 120 is assigned to the first axis operating command and the second axis operating command. In this case, the first axis operating command corresponds to an operation of the cross key 120 in the left-and-right direction, and the second axis operating command corresponds to an operation of the cross key 120 in the front-and-rear direction.

The left joystick 122 is assigned to the third axis operating command and the fourth axis operating command. In this case, the third axis operating command corresponds to an operation of the left joystick 122 in the left-and-right direction, and the fourth axis operating command corresponds to an operation of the left joystick 122 in the front-and-rear direction.

The right joystick 112 is assigned to the fifth axis operating command and the sixth axis operating command. In this case, the fifth axis operating command corresponds to an operation of the right joystick 112 in the left-and-right direction, and the sixth axis operating command corresponds to an operation of the right joystick 112 in the front-and-rear direction.

The first multipurpose key 110a is assigned to the robot control mode switch command.

The second multipurpose key 110b is assigned to the tool control mode switch command.

The third multipurpose key 110c is assigned to the tool on-off command, and the fourth multipurpose key 110d is assigned to the tool operating command.

The left command key 121 and the right command key 111 are not assigned to any command.

FIG. 10 is a table illustrating an assignment of the operation key of the game controller 33 to the operating command of the robot 5 in case of the independent key operation in the world mode. In the world mode, by commanding the position of the wrist 51e, the robot body 51 can be operated so that the wrist 51e is located at the commanded position.

Referring to FIGS. 3 and 10, the cross key 120 is assigned to an X-axis position command and a Y-axis position command. In this case, the X-axis position command corresponds to an operation of the cross key 120 in the left-and-right direction, and the Y-axis position command corresponds to an operation of the cross key 120 in the front-and-rear direction.

The left joystick 122 is assigned to an X-axis rotation command and a Y-axis rotation command. In this case, the X-axis rotation command corresponds to an operation of the left joystick 122 in the left-and-right direction, and the Y-axis rotation command corresponds to an operation of the left joystick 122 in the front-and-rear direction.

The right joystick 112 is assigned to a Z-axis rotation command. In this case, the Z-axis rotation command corresponds to an operation of the right joystick 112 in the front-and-rear direction.

The left command key 121 and the right command key 111 are assigned to a Z-axis positive position command and a Z-axis negative position command, respectively. Other manipulation key assignments are the same as those in the individual axis mode.

FIG. 11 is a table illustrating an assignment of the operation key of the game controller 33 to the operating command of the robot 5 in case of a plural key concurrent operation in the world mode.

Referring to FIGS. 3 and 11, the first multipurpose key 110a and the second multipurpose key 110b are assigned to a first command. The first command automatically moves the tool in the X-axis direction by a first operation, and then stops the tool by a second operation.

The third multipurpose key 110c and the fourth multipurpose key 110d are assigned to a second command. The second command automatically moves the tool in the Y-axis direction by a first operation, and then stops the tool by a second operation.

The left command key 121 and the right command key 111 are assigned to a third command. The third command automatically moves the tool in the Z-axis direction by a first operation, and then stops the tool by a second operation.

The cross key 120, the left joystick 122, and the right joystick 112 are not assigned to any command.

According to the manipulation key assignment, by simultaneously pushing a plurality of manipulation keys set by the assignment (pushing twice), the first to third commands move the tool along the X-axis, the Y-axis, or the Z-axis by any distance.

FIG. 12 is a table illustrating an assignment of the operation key of the game controller 33 to the operating command for the robot 5 in the tool mode.

Referring to FIGS. 3 and 12, the cross key 120 is assigned to an O-axis position command and an A-axis position command. In this case, the O-axis position command corresponds to an operation of the cross key 120 in the left-and-right direction, and the A-axis position command corresponds to an operation of the cross key 120 in the front-and-rear direction.

The left joystick 122 is assigned to a T-axis position command. In this case, the T-axis position command corresponds to an operation of the left joystick 122 in the front-and-rear direction.

The O-axis position command, the T-axis position command, and the A-axis position command are individual operating commands which instruct or command the posture of the tool. Therefore, in the tool mode, the tool can be operated correctly by operating only the tool (here, the end effector 51f).

The right joystick 112, the left command key 121, and the right command key 111 are not assigned to any command. Other manipulation key assignments are the same as those in the individual axis mode.

Thus, by performing the manipulation key assignment, the remote worker can freely manipulate the body 51 and the end effector 51f of the robot 5 by operating the manipulation key of the game controller 33.

Here, the following points are particularly important.

Since the individual operating commands for instructing the operation of each of the axes JT1-JT6 of the robot 5 and the position of the wrist 51e, and the posture of the tool (end effector 51f) correspond to the manipulation signals of the cross key 120, the left joystick 122, and the right joystick 112 which move the manipulation target in a desired direction similar to the user interface (game controller) 33 of the manipulation terminal 3, the operator (remote worker) of the manipulation terminal 3 can manipulate the robot 5, without feeling uncomfortable so much.

Since the first multipurpose key 110a and the second multipurpose key 110b are assigned to the single first command, the third multipurpose key 110c and the fourth multipurpose key 110d are assigned to the single second command, and the left command key 121 and the right command key 111 are assigned to the single third command, the conversion of the manipulation signal to the operating command can be performed even if the number of manipulation keys of the manipulation terminal is short for the number of operating commands.

Since the first to third commands are generated, the robot 5 can perform a plurality of operations. Here, for example, the painting gun 51f can be moved in the X-axis direction by a desired distance and can be stopped, by simultaneously pushing the manipulation keys of the first multipurpose key 110a and the second multipurpose key 110b twice. Note that, alternatively, for example, if the end effector 51f is a gripper, the first command may be a command for causing the robot to position a workpiece with a fitting protrusion above a workpiece with a fitting hole, then lower the workpiece with the fitting protrusion, and fit the fitting protrusion into the fitting hole.

Since the first multipurpose key 110a is assigned to the robot control mode switch command, the control mode of the robot 5 can be switched by operating the manipulation key of the manipulation terminal 3.

Since the second multipurpose key 110b is assigned to the tool control mode switch command, the control mode of the tool (end effector 51f) can be switched by operating the manipulation key of the manipulation terminal 3.

Note that, for example, the manipulation signal which is generated by operating one manipulation key of the manipulation terminal 3 by a given mode (e.g., pushing a plurality of times, a combination of a long push and a short push, etc.) may be converted into the individual operating command of the robot 5. Thereby, even if the number of manipulation keys of the manipulation terminal 3 is short for the number of individual operating commands, the manipulation signal can be converted into the individual operating command.

Moreover, the first to third commands may be a "pick and place" command for causing the robot 5 to lift the workpiece and place it at a given location, and a command for causing the robot 5 to move a painting gun to a given location and discharge paint from the painting gun. In this case, a given place or a given location may be instructed with the position command for the robot 5, and a necessary operation of the gripper or the painting gun may be instructed with an end effector operating command

[Operation]

Figure 13:
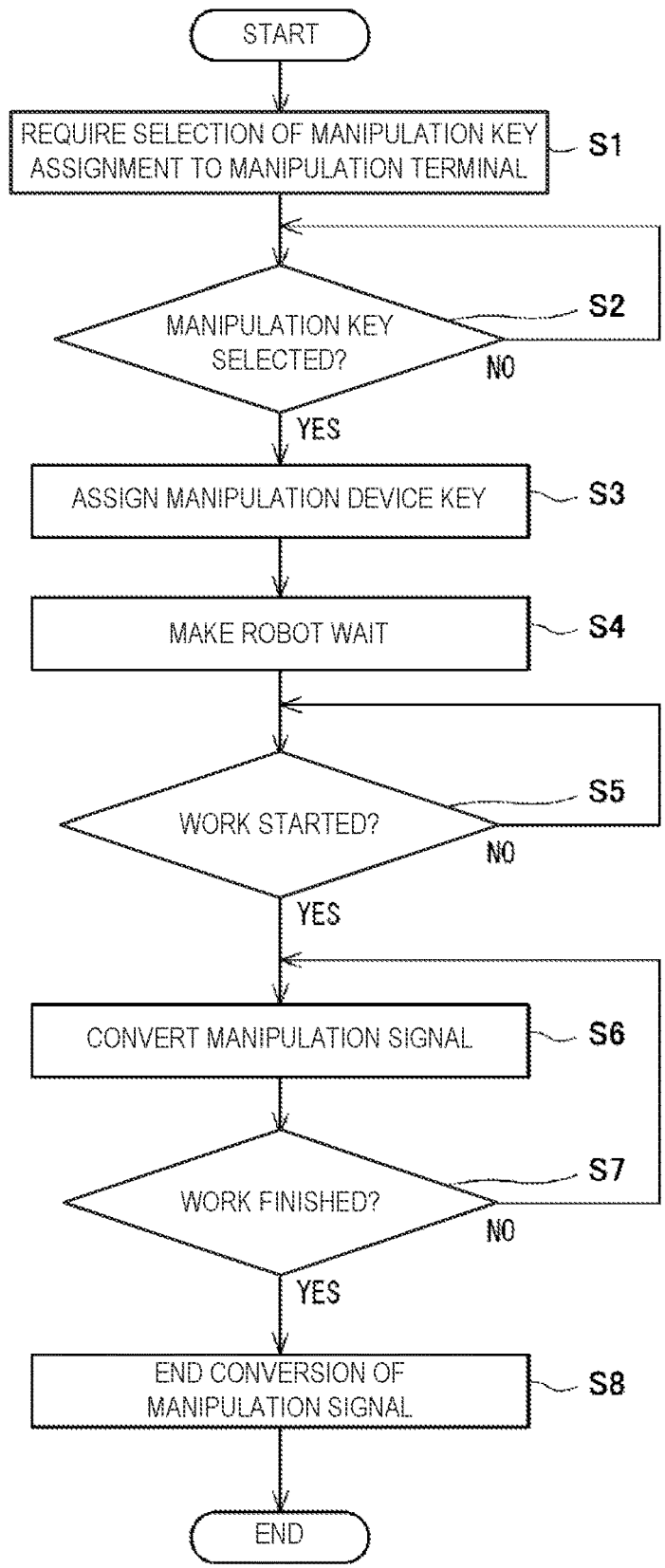
FIG. 13 is a flowchart illustrating operation of the intermediation device.

Next, operation of the intermediation device 2 configured as described above is described. FIG. 13 is a flowchart illustrating the operation of the intermediation device 2.

Referring to FIG. 13, the intermediation device first requires (requests) a selection (decision) of the manipulation key assignment to the manipulation terminal 3 (Step S1). In this case, the intermediation device 2, for example, presents the manipulation key assignments illustrated in FIGS. 9 to 12 which are created in advance, and makes the manipulation terminal 3 decide only correction(s). In this way, the individual operating command to be converted from the manipulation signal can be changed so that the operator (remote worker) of the manipulation terminal 3 can operate the manipulation key easily.

Next, the intermediation device 2 waits for the manipulation key being selected (NO at Step S2). If the manipulation key is selected (YES at Step S2), the manipulation signal is converted to the individual operating command according to the manipulation key assignment selected by the manipulation terminal 3 which assigns the manipulation device key (assigning the manipulation key) (Step S3).

Next, the robot 5 waits for a work (Step S4).

Next, the intermediation device 2 waits for a start of the work (NO at Step S5). Then, if the work is started (YES at Step S5), the manipulation signal of the manipulation terminal 3 is converted into the individual operating command, and it is sent to the robot 5 (Step S6).

Next, if the work is finished (YES at Step S7), the intermediation device 2 ends the conversion of the manipulation signal into the individual operating command (Step S8).

Note that the intermediation device 2 may be configured so that, when a manipulation key change notice is received from the manipulation terminal 3 outside of work hours, the manipulation signal converting module 16 changes one or more individual operating commands to be converted from one or more manipulation signals according to the manipulation key change notice.

According to Embodiment 1 described above, when the manipulation signal converting module 16 receives one or more manipulation signals corresponding to a plurality of manipulation keys of the manipulation terminal 3, since it converts the one or more manipulation signals into the one or more individual operating commands in the operating command for the robot 5, and sends the one or more individual operating commands to the robot 5, the robot 5 can be manipulated through the network 4 and the intermediation device 2 by operating the manipulation key of the manipulation terminal 3. Therefore, the robot work working system 1 can be caused to function, and, as a result, the utilization of the remote control robot can be expanded.

Embodiment 2

Figure 14:
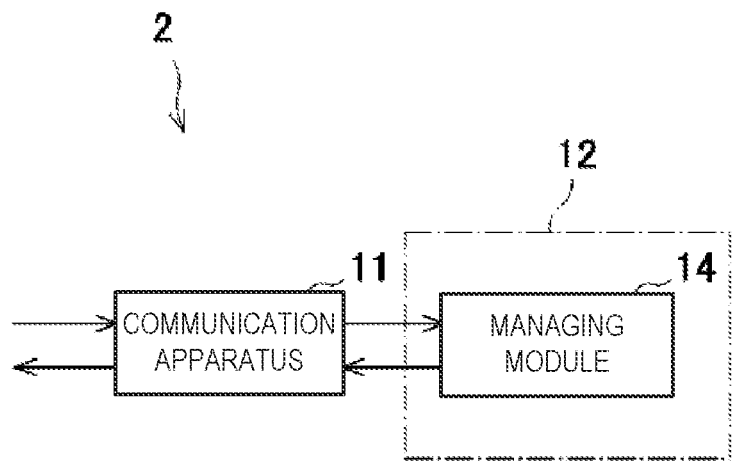
FIG. 14 is a functional block diagram illustrating one example of a configuration of an intermediation device according to Embodiment 2 of the present disclosure.
Figure 15:
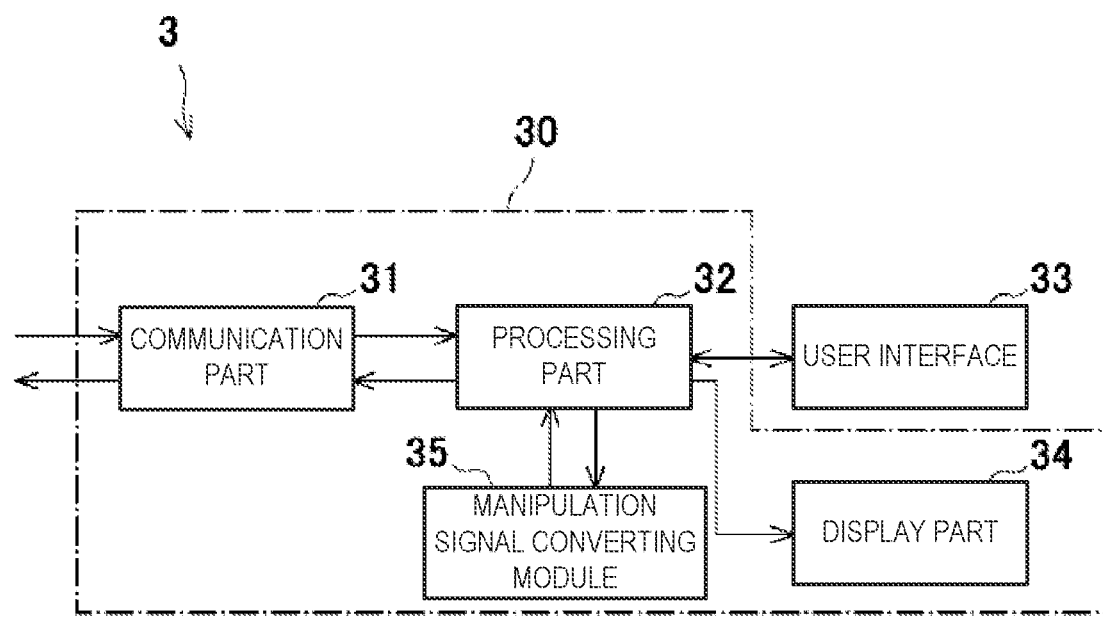
FIG. 15 is a functional block diagram illustrating one example of a configuration of a manipulation terminal in Embodiment 2 of the present disclosure.

FIG. 14 is a functional block diagram illustrating one example of a configuration of an intermediation device 2 according to Embodiment 2 of the present disclosure. FIG. 15 is a functional block diagram illustrating a configuration example of a manipulation terminal according to Embodiment 2 of the present disclosure.

In Embodiment 2, the intermediation device 2 downloads a program for implementing the manipulation signal converting module 16 to the manipulation terminal 3. Therefore, as illustrated in FIG. 15, a manipulation signal converting module 35 is constituted in the manipulation terminal 3. The manipulation signal converting module 35 is connected to the processing part 32, and operates similarly to the manipulation signal converting module 16 of Embodiment 1. On the other hand, as illustrated in FIG. 14, although the information processing device 12 is provided with the managing module 14, it is not provided with the manipulation signal converting module.

Similar effects to Embodiment 1 can be acquired by Embodiment 2 described above.

It is apparent for the person skilled in the art that many improvements and other embodiments are possible from the above description. Therefore, the above description is to be interpreted only as illustration.

INDUSTRIAL APPLICABILITY

The intermediation device and the intermediating method of the present disclosure are useful as the intermediation device and the intermediating method which can expand the utilization of the remote control robot.

DESCRIPTION OF REFERENCE CHARACTERS

1 Robot Work Working System
2 Intermediation Device
3 Manipulation Terminal
4 Network
5 Robot
11 Communication Apparatus
12 Information Processing Device
16 Manipulation Signal Converting Module
30 Main Body
31 Communication Part
32 Processing Part
33 User Interface
34 Display Part
35 Manipulation Signal Converting Module
51 Robot Body
52 Robot Controller
56 Display
110 Operation Key Group
111 Right Command Key
112 Right Joystick
120 Cross Key
121 Left Command Key
122 Left Joystick
CA Camera
CL Computing Unit
M Memory
P Processor
JT1-JT6 First to Sixth Axes

The invention claimed is:

1. A robot control system comprising:
an intermediation device connected to a manipulation terminal and a robot through a network, the manipulation terminal including a manipulation key,
a robot manipulation device that is different from the manipulation terminal and is dedicated to the robot and being configured to output a robot control signal,
a manipulation signal converting module in the intermediation device or the manipulation terminal, and wherein, when the manipulation signal converting module receives a manipulation signal corresponding to the manipulation key, the manipulation signal converting module converts the manipulation signal into at least one individual operating command, and
a robot controller configured to switch between
a case of providing the individual operating command to control the robot by the manipulation terminal when conversion of the manipulation signal is necessary, and
a case of providing the robot control signal to control the robot by the robot manipulation device when conversion of the robot control signal is not necessary.

2. The robot control system of claim 1, wherein
the at least one individual operating command includes one or more individual operating commands,
the manipulation terminal includes a plurality of manipulation keys, and when the manipulation signal converting module receives one or more manipulation signals corresponding to one or more of the plurality of manipulation keys, the manipulation signal converting module converts the one or more manipulation signals into the one or more individual operating commands, and sends the one or more individual operating commands to the robot controller.

3. The robot control system of claim 2, wherein
the plurality of manipulation keys include a move key configured to move a manipulation target and a function key used for multiple purposes,
the individual operating command includes a position command for instructing the position of a wrist part of the robot, and an end effector operating command for controlling operation of an end effector attached to the wrist part of the robot, and
the manipulation signal converting module converts the manipulation signal corresponding to the move key into the position command and converts the manipulation signal corresponding to the function key into the end effector operating command.

4. The robot control system of claim 2, wherein, when the intermediation device receives a manipulation key change notice from the manipulation terminal, the manipulation signal converting module changes the one or more individual operating commands to be converted from the one or more manipulation signals, according to the manipulation key change notice.

5. The robot control system of claim 2, wherein, when a number of manipulation keys of the manipulation terminal is short for a number of the one or more individual operating commands, the manipulation signal converting module converts each of the one or more manipulation signals corresponding to operation in a given mode of one or more manipulation keys among the plurality of manipulation keys into the one or more individual operating commands.

6. The robot control system of claim 2, wherein the manipulation signal converting module converts at least one of the one or more manipulation signals into one or more individual operating commands for causing the robot to perform a plurality of operations based on the converted one or more individual operating commands.

7. The robot control system of claim 2, wherein the manipulation signal converting module converts at least one of the one or more manipulation signals into the individual operating command for causing the robot to perform a plurality of operations.

8. The robot control system of claim 2, wherein the manipulation signal converting module converts at least one of the one or more manipulation signals into the individual operating command for switching a control mode of the robot.

9. The robot control system of claim 2, wherein
the intermediation device requests the manipulation terminal to determine a manipulation key assignment indicating how to associate the plurality of manipulation keys with the one or more individual operating commands and convert the one or more manipulation signals corresponding to the plurality of manipulation keys into the one or more individual operating commands, and
the manipulation signal converting module converts the one or more manipulation signals into the one or more individual operating commands, according to the manipulation key assignment determined by the manipulation terminal.

10. The robot control system of claim 1, wherein the intermediation device performs the conversion from the manipulation signal to the at least individual operating command based on model names received from a selected manipulation terminal and a selected robot.

11. The robot control system of claim 10, wherein the intermediation device stores patterns of the signal conversion according to the model names of the selected manipulation terminal and the selected robot, and performs the signal conversion while applying the pattern corresponding to the model names of the selected manipulation terminal and the selected robot.

12. A robot control method using an intermediation device connected to a manipulation terminal and a robot through a network, the manipulation terminal including a manipulation key, a robot manipulation device being different from the manipulation terminal and being dedicated to the robot, and a manipulation signal converting module being in the intermediation device or the manipulation terminal such that when the manipulation signal converting module receives a manipulation signal corresponding to the manipulation key, the manipulation signal converting module converts the manipulation signal into at least one individual operating command, the method comprising:
operating a robot controller to switch between
a case of providing the individual operating command to control the robot by the manipulation terminal when the robot controller receives the individual operating command from the manipulating signal converting module when conversion of the manipulation signal is necessary, and
a case of providing the robot control signal to control the robot by the robot manipulation device when the robot controller receives the robot control signal from the robot manipulation device when conversion of the robot control signal is not necessary.

13. The robot control method of claim 12, wherein
the at least one individual operating command includes one or more individual operating commands,
the manipulation terminal includes a plurality of manipulation keys, and
the intermediating method comprises, when the manipulation signal converting module receives one or more manipulation signals corresponding to one or more of the plurality of manipulation keys, converting the one or more manipulation signals into the one or more individual operating commands, and sending the one or more individual operating commands to the robot controller, by the manipulation signal converting module.

14. The robot control of claim 13, wherein
the one or more manipulation keys include a move key configured to move a manipulation target and a function key used for multiple purposes,
the at least one individual operating command includes a position command for instructing the position of a wrist part of the robot, and an end effector operating command for controlling operation of an end effector attached to the wrist part of the robot, and
the robot control method further comprises converting the manipulation signal corresponding to the move key into the position command and converting the manipulation signal corresponding to the function key into the end effector operating command, by the manipulation signal converting module.

15. The robot control method of claim 13, further comprising:

changing, when the intermediation device receives a manipulation key change notice from the manipulation terminal, the one or more individual operating commands to be converted from the one or more manipulation signals, according to the manipulation key change notice, by the manipulation signal converting module.

16. The robot control method of claim 13, further comprising:

when a number of the one or more manipulation keys of the manipulation terminal is short for a number of one or more individual operating commands, converting each of the one or more manipulation signals corresponding to operation in a given mode of one or more manipulation keys among the plurality of manipulation keys into the one or more individual operating commands, by the manipulation signal converting module.

17. The robot control method of claim 13, further comprising:

converting at least one of the one or more manipulation signals into the one or more individual operating commands for causing the robot to perform a plurality of operations based on the converted one or more individual operating commands, by the manipulation signal converting module.

18. The robot control method of claim 13, further comprising:

converting at least one of the one or more manipulation signals into the individual operating command for causing the robot to perform a plurality of operations, by the manipulation signal converting module.

19. The robot control method of claim 13, further comprising:

converting at least one of the one or more manipulation signals into the individual operating command for switching a control mode of the robot, by the manipulation signal converting module.

20. The robot control method of claim 13, further comprising:

requesting the manipulation terminal to determine a manipulation key assignment indicating how to associate the plurality of manipulation keys with the one or more individual operating commands and convert the one or more manipulation signals corresponding to the plurality of manipulation keys into the one or more individual operating commands, by the intermediation device; and converting the one or more manipulation signals into the one or more individual operating commands, according to the manipulation key assignment determined by the manipulation terminal, by the manipulation signal converting module.

21. A robot control system comprising:

an intermediation device connected to a plurality of manipulation terminals and a robot through a network, the plurality of manipulation terminals including a first terminal dedicated for the robot and a second terminal non-dedicated for the robot, the robot operating according to an operating command including an individual operating command, and each of the plurality of manipulation terminals includes a manipulation key, and a manipulation signal converting module in the intermediation device or in each of the plurality of manipulation terminals, and wherein, upon receiving a manipulation signal corresponding to the manipulation key from the second terminal, the manipulation signal converting module converts the manipulation signal into the individual operating command based on model names received from the second manipulation terminal and the robot and sends the converted individual operating command to the robot for causing the robot to operate according to the converted individual operating command, while upon receiving the manipulation signal corresponding to the manipulation key from the first terminal, the manipulation signal converting module sends the manipulation signal to the robot without the conversion for causing the robot to operate according to the manipulation signal from the first terminal.

* * * * *